US008936086B2

(12) United States Patent
Liang et al.

(10) Patent No.: US 8,936,086 B2
(45) Date of Patent: Jan. 20, 2015

(54) METHODS OF FLUID LOSS CONTROL, DIVERSION, AND SEALING USING DEFORMABLE PARTICULATES

(75) Inventors: Feng Liang, Cypress, TX (US); Bradley L. Todd, Duncan, OK (US); Thomas D. Welton, Duncan, OK (US); Rajesh K. Saini, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 585 days.

(21) Appl. No.: 13/252,349

(22) Filed: Oct. 4, 2011

(65) Prior Publication Data
US 2013/0081813 A1 Apr. 4, 2013

(51) Int. Cl.
*E21B 33/13* (2006.01)
*C09K 8/508* (2006.01)
*C09K 8/035* (2006.01)

(52) U.S. Cl.
CPC ............... *C09K 8/035* (2013.01); *C09K 8/508* (2013.01)
USPC ......................................... 166/292; 166/300

(58) Field of Classification Search
USPC ........................................ 166/278, 300, 292
See application file for complete search history.

(56) References Cited

U.S. PATENT DOCUMENTS

| 4,670,501 | A | 6/1987 | Dymond et al. |
| 4,986,353 | A | 1/1991 | Clark et al. |
| 5,249,627 | A | 10/1993 | Harms et al. |
| 5,833,000 | A | 11/1998 | Weaver et al. |
| 5,853,048 | A | 12/1998 | Weaver et al. |
| 6,439,309 | B1 | 8/2002 | Matherly et al. |
| 6,488,091 | B1 | 12/2002 | Weaver et al. |
| 6,817,414 | B2 | 11/2004 | Lee |
| 7,036,587 | B2 * | 5/2006 | Munoz et al. ............ 166/279 |
| 7,044,220 | B2 | 5/2006 | Nguyen et al. |
| 7,096,947 | B2 | 8/2006 | Todd et al. |
| 7,132,389 | B2 | 11/2006 | Lee |
| 7,482,309 | B2 | 1/2009 | Ravi et al. |
| 7,506,689 | B2 | 3/2009 | Surjaatmadja et al. |
| 7,608,566 | B2 * | 10/2009 | Saini et al. ............... 507/219 |
| 7,645,725 | B2 | 1/2010 | Weaver et al. |
| 7,775,278 | B2 | 8/2010 | Willberg et al. |
| 2004/0231845 | A1 | 11/2004 | Cooke, Jr. |
| 2004/0261995 | A1 | 12/2004 | Nguyen et al. |
| 2004/0261996 | A1 | 12/2004 | Munoz, Jr. et al. |
| 2005/0034861 | A1 | 2/2005 | Saini et al. |
| 2005/0065037 | A1 | 3/2005 | Constien |
| 2005/0205265 | A1 | 9/2005 | Todd et al. |
| 2005/0274517 | A1 | 12/2005 | Blauch et al. |
| 2005/0277554 | A1 | 12/2005 | Blauch et al. |
| 2006/0205608 | A1 | 9/2006 | Todd |
| 2006/0276345 | A1 | 12/2006 | Todd et al. |
| 2007/0078063 | A1 | 4/2007 | Munoz, Jr. |
| 2008/0312107 | A1 | 12/2008 | Harris et al. |
| 2008/0314594 | A1 | 12/2008 | Still et al. |
| 2009/0038858 | A1 | 2/2009 | Griffo et al. |
| 2010/0200235 | A1 | 8/2010 | Luo et al. |
| 2010/0273685 | A1 | 10/2010 | Saini et al. |
| 2011/0114312 | A1 | 5/2011 | Todd |
| 2011/0192605 | A1 | 8/2011 | Wann |
| 2013/0081801 | A1 | 4/2013 | Liang et al. |
| 2013/0081821 | A1 | 4/2013 | Liang et al. |

FOREIGN PATENT DOCUMENTS

| EP | 2374991 A2 | 10/2011 |
| GB | 2 448 629 A | 10/2008 |
| WO | WO 2007/113481 A1 | 10/2007 |
| WO | WO 2009/095677 A1 | 8/2009 |

OTHER PUBLICATIONS

Molner et al., "Factors Affecting the Properties of PLA/CaSo4 composites: Homogeneity and Interactions," Express Polymer Letters vol. 3, No. 1, (2009) 49-61.
International Search Report and Written Opinion for PCT/US2012/56335 dated Dec. 5, 2012.
International Search Report and Written Opinion for PCT/US2012/055100 dated Feb. 4, 2013.
U.S. Appl. No. 12/620,842, filed Nov. 18, 2009.
International Search Report and Written Opinion for PCT/US2012/056580 dated Jan. 14, 2014.
Tricoctyl Trimellitate Material Safety Data Sheet; Dec. 24, 2012, Sigma-Aldrich; pp. 1-6.

* cited by examiner

*Primary Examiner* — Catherine Loikith
(74) *Attorney, Agent, or Firm* — McDermott Will & Emery LLP; Holly Soehnge

(57) ABSTRACT

Method including the steps of providing a treatment fluid that comprises a base fluid and polymeric particulates and introducing the treatment fluid into a subterranean formation having a temperature above about 65° C. The polymeric particulates comprise a degradable polymer and a plasticizer and exhibit a $T_g$ above about −15° C. When the polymeric particulates are placed into a subterranean formation having a temperature above about 65° C. they transform from rigid form to malleable form and are able to provide fluid loss, seal the rock surfaces for fluid diversion, or plug an area along the annulus of a well bore. The malleable particulates then degrade over time in the subterranean formation.

22 Claims, No Drawings

METHODS OF FLUID LOSS CONTROL, DIVERSION, AND SEALING USING DEFORMABLE PARTICULATES

BACKGROUND

The present invention relates to methods of fluid loss control, diversion, and sealing using deformable particulates. More particularly, the present invention relates to methods useful in subterranean operations using malleable particulates comprising a degradable polymer combined with a plasticizer.

Providing effective fluid-loss control for well treatment fluids is highly desirable. A "treatment fluid" is a fluid used in a subterranean application for any purpose. The term "treatment" as used herein does not imply any particular action by the fluid or any component thereof. Fluid-loss control materials are often added to treatment fluids to aid in fluid loss control. These are additives that are generally designed to lower the volume of a filtrate that passes through a filter medium, e.g., permeable rock or a filter cake. Most attain their fluid-loss control from the presence of solvent-specific solids, or from polymers that rely on filter cake buildup and on viscoelasticity to inhibit flow into and through the formation. A variety of fluid-loss control materials have been used and evaluated, including foams, oil-soluble resins, acid-soluble particulates, graded salt slurries, linear viscoelastic polymers, degradable polymers and heavy metal-crosslinked polymers. Their respective comparative effects are well documented.

An example of a subterranean treatment that often uses an aqueous treatment fluid is hydraulic fracturing. In a hydraulic fracturing treatment, a viscous fracturing fluid is introduced into the formation at a high enough rate to exert a sufficient pressure on the formation to create and/or extend fractures therein. The viscous fracturing fluid suspends proppant particles that are to be placed in the fractures to prevent the fractures from fully closing (once the hydraulic pressure is released), thereby forming conductive channels within the formation through which hydrocarbons can flow toward the well bore for production. In certain circumstances, a portion of the fracturing fluid may be lost during the fracturing operation, e.g., through undesirable leak-off into natural or manmade fractures present in the formation. Typically, operators have attempted to solve this problem by including a fluid loss control additive in the fracturing fluid. Many conventional fluid loss control additives permanently reduce the permeability of a subterranean formation, negatively affect the rheology of the treatment fluid in which they are used, and/or reduce the rate at which the fluid is allowed to penetrate or leak off into desirable locations within the subterranean formation. Moreover, while it may be desirable to control or prevent fluid loss for a given period of time, in some instances it may become desirable to later allow a treatment fluid to penetrate or leak off into that portion of the subterranean formation. Thus, costly and time-consuming operations may be required to reverse the effects of conventional fluid loss control additives on the treatment fluid and/or to restore permeability to those portions of the subterranean formation affected by the fluid loss control additives.

In addition to helping control the loss of fluid into the formation, additives may also be added to treatment fluids in order to divert the treatment toward desired areas within the formation. For example, it may be desirable to add a diverting agent toward the end of an operation treating a section of a subterranean formation such that the agent will then slow or stop the flow of further treatment fluid into that area, thus diverting later-placed fluid to other areas.

Various particulates have been used in treatment fluids as a fluid loss control agent and/or diverting agent. Particulates may be used as fluid loss control materials in treatment fluids to fill and seal the pore spaces and natural and manmade fractures in a subterranean formation or to contact the surface of a formation face or proppant pack, thereby forming a filter cake that blocks the pore spaces and natural and manmade fractures in the formation or proppant pack.

The use of particulates in fluid loss control presents several challenges. For example, if the sizes of the particulates are not optimized for the pore spaces and fractures, remedial treatments may be required to remove the previously-placed fluid loss control materials. Generally, particulates that have become lodged in pore spaces, fractures, or pore throats may be difficult or costly to remove. Furthermore, particulate fluid loss control materials may not be effective in low-permeability formations since the leakoff rate in those formations is not high enough to pull the particulates into the pore spaces or fractures or into contact with the surface of the formation face or proppant pack so as to block or seal off the pore spaces and fractures.

The particles of polymeric fluid loss control additives may also require a proper distribution of sizes in order to effectively fill the pore spaces. The "modality" of a polymeric material generally refers to the number of size ranges in the mixture of particles. For example, a "monomodal" polymeric material refers to a material that comprises molecules that have particle size distributions within a single range, whereas a "multimodal" polymeric material refers to a material that comprises at least two pluralities of polymer molecules having different average particle sizes. In practice, multimodal particulates are generally better at fluid loss control as it is not always possible to predict the exact sizes of the pore spaces, fractures, and the pore spaces may be heterogeneous in size. That is, a heterogeneous mixture of particles is typically better suited, as compared to a homogeneous mixture of particle sizes, to seal a range of various pore sizes and fractures that are encountered downhole. A mixture of sizes provides more effective bridging and shut off in downhole applications.

Particulates made of degradable material are especially useful due to the ease associated with their clean up. While degradable particulates may be useful for a variety of downhole operations, degradable particulates can be problematic in that they are difficult to grind into the small size necessary to prevent fluid loss. For example, degradable particulate materials such as polylactic acid often require cryogenic grinding to achieve the necessary small sizes needed to seal pore spaces and fractures. Furthermore, there are technical and physical barriers to how small polylactic acid may be ground.

SUMMARY OF THE INVENTION

The present invention relates to methods of fluid loss control, diversion, and sealing using deformable particulates. More particularly, the present invention relates to methods useful in subterranean operations using particulates comprising a degradable polymer combined with a plasticizer.

Some embodiments of the present invention provide methods comprising: providing a treatment fluid that comprises a base fluid and monomodal polymeric particulates wherein the polymeric particulates comprise a degradable polymer and a plasticizer and exhibits a $T_g$ above about −15° C.; introducing the treatment fluid into a subterranean formation having a temperature above about 65° C. such that the particulates transform from rigid to malleable form and are able to provide fluid loss, seal the rock surfaces for fluid diversion, or plug an area along the annulus of a well bore; and, degrading the malleable particulates over time in the subterranean formation.

Other embodiments of the present invention provide methods comprising: providing a treatment fluid that comprises a base fluid and malleable particulates wherein the malleable particulates comprise a degradable polymer and a plasticizer and wherein the malleable polymer has a mean particulate size of between 5 microns and 8000 microns; introducing the treatment fluid into a subterranean formation such that the malleable particulates provide fluid loss, seal the rock surfaces for fluid diversion, or plug an area along the annulus of a well bore; and, degrading the malleable particulates over time in the subterranean formation.

Still other embodiments of the present invention provide methods comprising: providing a treatment fluid that comprises a base fluid and malleable particulates wherein the malleable particulates comprise a degradable polymer and a plasticizer, wherein the malleable polymer has a glass transition temperature between about −15° C. to about 60° C.; introducing the treatment fluid into a subterranean formation having a first bottomhole static temperature such that the malleable particulates provide fluid loss, seal the rock surfaces for fluid diversion, or plug an area along the annulus of a well bore; and, degrading the malleable particulates over time in the subterranean formation.

The features and advantages of the present invention will be readily apparent to those skilled in the art upon a reading of the description of the preferred embodiments that follows.

DETAILED DESCRIPTION

The present invention relates to methods of fluid loss control, diversion, and sealing using deformable particulates. More particularly, the present invention relates to methods useful in subterranean operations using particulates comprising a degradable polymer combined with a plasticizer.

As used herein, "pliability" describes the ability of a material to be flexible or easily bent without breaking; a pliable particle as the term is used herein may experience limited extrusion within or through the pore spaces in the formation so long as they are able to withstand the differential without completely extruding. As used herein, the term "degradation," or "degradable," refers to the conversion of materials into smaller components, intermediates, or end products by the result of solubilization, hydrolytic degradation, biologically formed entities (e.g., bacteria or enzymes), chemical reactions, thermal reactions, reactions induced by radiation, or any other suitable mechanism. The term "polymers," as used herein, does not imply any particular degree of polymerization; for instance, oligomers are encompassed within the definition.

The present invention provides improved, malleable particulates that can be designed to exhibit desired levels of pliability at downhole temperatures. Particulates with designed pliability rather than a designed size (or range of sizes) may reduce the need for cryogrinding and provide particulates that are useful in providing fluid loss control, diversion, and/or sealing across a broad range of formation pore sizes and fracture faces.

Providing effective fluid loss control for subterranean treatment fluids is highly desirable. "Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, fracturing operations, acidizing operations, gravel-packing operations, workover operations, well bore clean-out operations, frac plug drill-out operations and the like. Fluid loss may be problematic in any number of these operations. In fracturing treatments, for example, fluid loss into the formation may result in a reduction in fluid efficiency, such that the fracturing fluid cannot propagate the fracture as desired.

Particulate fluid loss control materials are additives that lower the volume of a filtrate that passes through a filter medium. Particulate fluid loss additives are traditionally made from inert materials and are able to plug pore spaces. That is, particulate additives are able to block pore throats, fractures and spaces that otherwise allow a treatment fluid to leak out of a desired zone and into an undesired zone. Where "fractures" are discussed herein, it should be understood that the fractures may be naturally occurring, manmade, or natural factures that have been extended by a treatment such as fracturing or acidizing. Particulate materials may be used as fluid loss control materials in subterranean treatment fluids to fill/bridge the pore spaces in a formation matrix, fractures, perforation tunnels, and/or proppant pack and/or to contact the surface of a formation face, perforation tunnels and/or proppant pack, thereby forming a type of filter cake that blocks the pore spaces in the formation, perforation tunnels, or proppant pack, and prevents fluid loss therein.

In some embodiments, malleable particulates of the present invention may be used in conjunction with a fracturing method. In some preferred embodiments the malleable particulates are used as a fluid loss control agent during the fracturing operation, that is, the fluid loss control agent is placed into a treatment fluid that is then placed into the portion of the subterranean formation at a pressure/rate sufficient to create or extend at least one fracture in that portion of the subterranean formation.

Diverting agents have similar actions but strive for a somewhat different approach. Diverting agents are used to seal off a portion of the subterranean formation. By way of example, in order to divert a treatment fluid from highly permeable portions of the formation into the less permeable portions of the formation, a volume of treatment fluid may be pumped into the formation followed by a diverting material to seal off a portion of the formation where the first treatment fluid penetrated. After the diverting material is placed, a second treatment fluid may be placed wherein the second treatment will be diverted to a new zone for treatment by the previously placed diverting agent. When being placed, the treatment fluid containing the diverting agent will flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid have been pumped. Generally, the methods of diverting using malleable particulates of the present invention are preformed at matrix flow rates; that is, flow rates and pressures that are below the rate/pressure sufficient to create or extend fractures in that portion of a subterranean formation.

Plugging agents are similar to diverting agents. Whereas diverting agents are used to seal off a portion of the subterranean formation, plugging agents are used to seal off a well bore, providing zonal isolation. When a particulate plugging agent is used, the effect is similar to that of a diverting agent, that is a fluid is placed having the plugging agent therein and the plugging agent seals the well bore face such that fluid cannot enter the permeable zones until the plugging agent is removed. In some embodiments it may be desirable to use the malleable particulates to completely fill a portion of an annulus along a well bore. In such embodiments, large quantities of the malleable particulates will likely be required in order to completely close a flow path rather than simply block pore throats, fractures, or rock faces.

Whether the malleable particulates are used for fluid loss control, diversion, or plugging, the pliability of the particulates may allow larger sized particulates to be used and may act to more effectively seal the desired location. The compounds of the present invention may be designed for use over a large temperature range with a desirable level of pliability dependent on their actual subterranean application. For example, degradable particles formed by the compounds of the present invention result in malleable particles that can form a better seal when placed in the subterranean formation but retain a relatively hard (not malleable) character at room temperature such that they can be more easily ground and stored. Without being limited by theory, it is believed that the use of varying size (multimodal) particles to form a complete seal and prevent fluid loss or divert fluids in a subterranean formation may be obviated as the particulates that become malleable downhole would be capable of deforming to form an effective seal.

Without being limited by theory, it is believed that a plasticizer can lower the glass transition temperature of a polymer suitable for use in the present invention. Glass transition or liquid-glass transition is a polymer phenomenon that drastically affects the physical properties of a given polymer above and below $T_g$. As used herein, "amorphous" describes a solid that is non-crystalline and lacks the long-range order characteristics of a crystal. For polylactic acid, the polymerization of racemic mixture of L- and D-lactides usually leads to the synthesis of poly-DL-lactide that is amorphous. The degree of crystallinity in the resulting reaction may be controlled by the ratio of D to L enantiomers used and/or type of catalyst used during the polymerization. Without being limited by theory, it is believed that polylactic acid may have both an amorphous portion, which is subject to glass transition, and a crystalline portion, which is subject to crystalline melting. A polymeric material can undergo a reversible transition from a hard and relatively brittle ("rigid") state into a molten or rubber-like ("malleable") state at its glass transition temperature ($T_g$). Glass transition or liquid-glass transition is a polymer phenomenon that drastically affects the physical properties of a given polymer above and below $T_g$ and is generally applicable to amorphous or semi-crystalline or crystalline polymers. Macroscopically, a material below its $T_g$ is often hard and brittle whereas the same material above its $T_g$ is often soft and flexible. Depending on desirability, it may be advantageous to provide a degradable polymer of the present invention having a glass transition temperature which is above or below room or storage temperature. In some instances, it may be desirable to provide a degradable polymer of the present invention having a glass transition temperature which is below subterranean usage temperatures.

In some cases, the addition of treatment fluids (e.g., acidizing fluids, fracturing fluids, etc.) into the subterranean formation can lower the bottomhole static temperature (BHST). In some embodiments, the malleable particulate may be modified by the addition of plasticizer to lower the glass transition temperature so that the particulate may be soft and flexible even in the lower bottomhole static temperatures. As used herein "bottomhole static temperature" refers to the temperature of the undisturbed formation at the final depth in a well. This temperature is typically measured under static conditions.

The treatment fluids of the present invention generally comprise a solution comprising a base fluid and malleable particulates of the present invention. The degradable particulates should be present in the treatment fluid in an amount sufficient to reduce fluid loss in a subterranean formation, to divert the fluids from one portion of the formation to another, or to plug a well bore. The malleable particulates may be any shape or size, including, but not limited to, spherical, fiber-like, ovoid, ribbons, etc. It should be noted that when "about" is provided at the beginning of a numerical list, "about" modifies each number of the numerical list. In some embodiments, malleable particulates may have a mean particle diameter in the range of from a lower limit of about 5 microns, 25 microns, 50 microns, 75 microns, 100 microns, 150 microns, 200 microns, 250 microns, 300 microns, 350 microns, 400 microns, 450 microns, 500 microns to an upper limit of about 8000 microns, 7000 microns, 6000 microns, 5000 microns, 4000 microns, 3000 microns, 2000 microns, 1000 microns, 500 microns, 400 microns, 300 microns, 250 microns, 200 microns, 150 microns, or 100 microns, and wherein the mean particle diameter may range from any lower limit to any upper limit and encompass any subset between the upper and lower limits. Some of the lower limits listed above are greater than some of the listed upper limits, and one skilled in the art will recognize that the selected subset will require the selection of an upper limit in excess of the selected lower limit. A preferred mean particle diameter for the malleable particulates may be between about 100 microns to 250 microns, another preferred mean particle diameter for the malleable particulates may be about 150 microns or greater. In some preferred embodiments, the malleable particulates will be monomodal and relatively uniform in size. In other embodiments the malleable particulates may be multimodal.

Where the methods and compositions of the present invention are used in subterranean applications, the base fluid component of the treatment fluid may be any liquid component suitable for transporting solids that is commonly included in subterranean applications, including, but not limited to, water, brines, viscosified fluids, foams, aqueous gels, viscoelastic surfactant gels, emulsions, combinations thereof, and other fluids suitable for transporting solids. Where the base fluid component comprises an aqueous gel, the aqueous gel generally comprises water and a gelling agent. In some embodiments, the aqueous gel further may comprise water, a gelling agent, and a crosslinking agent that crosslinks at least a portion of the molecules of the gelling agent further increasing the viscosity of the fluid, which further may affect the base fluid's ability to suspend solids. Where the base fluid component comprises an emulsion, the emulsion may comprise one or more immiscible liquids; for example, the emulsion may comprise an aqueous gel and a liquefied, normally gaseous fluid (e.g., carbon dioxide). In certain embodiments, it may be desirable to increase the viscosity of a treatment fluid so as to reduce fluid loss into the subterranean formation and reduce the sedimentation of suspended particles. Generally, the base fluid component may be present in the fluids of the present invention in an amount in the range of from about 40% to about 99% by volume of the fluid, when measured at the surface, prior to placement of the treatment fluid in a subterranean formation.

The malleable particulates present in the fluids of the present invention generally comprise a degradable polymer and a plasticizer. Degradable polymers are preferred for use in the present invention such that the loss of permeability due to the placement of the particulates is often undesirable after a treatment is completed. For example, where the malleable particulates are used to divert an acidizing treatment fluid from highly permeable portions of the formation into the less permeable portions of the formation, once all of the portions have been treated with the acid, the diverting agent must be removed to restore permeability and allow for production of hydrocarbons from the formation.

The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like. Generally, the degradable polymers used in the present invention should be formulated and have a molecular weight such that they are solid at room temperature and do not generally plasticize at room temperature by the addition of oil or an aqueous phase.

Suitable examples of degradable polymers that may be used in accordance with the present invention include, but are not limited to, homopolymers, random, block, graft, and star- and hyper-branched polymers. Examples of suitable degradable polymers that may be used in conjunction with the methods of this invention include, but are not limited to, polysaccharides (such as dextran or cellulose); chitin; chitosan; proteins; aliphatic polyesters; polylactic acids; poly(glycolides); poly(ϵ-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly etheresters, polyester amides, polyamides, and copolymers or blends of any of these degradable materials. The term "copolymer," as used herein, is not limited to the combination of two polymers, but includes any combination of polymers, e.g., terpolymers, block copolymers, graft copolymers, star block copolymers, and the like. Of these suitable polymers, polylactic acids, and poly(lactide)-co-poly(glycolide) copolymers (PLA/PGA) may be used, in some embodiments. As used herein, "polylactic acid" refers to a polymer that may be synthesized from lactic acid, for example, by a condensation reaction or by the ring-opening polymerization of a cyclic lactide monomer, and is sometimes referred to as "PLA," "polylactate," or "polylactide." As used herein, "poly(glycolide)" refers to a polymer that may be synthesized from glycolic acid, for example, by a condensation reaction or by a ring-opening polymerization, and is sometimes referred to as "PGA," "polyglycolide," or "polyglycolic acid."

Other degradable polymers that are subject to degradation also may be suitable. The choice may depend on the particular application and the conditions involved. Other guidelines to consider include the degradation products that result, the time required for the requisite degree of degradation, the desired result of the degradation (e.g., voids), temperature, time, and additives that may be used. In some instances, the degradable material may be capable of releasing a desirable degradation product, e.g., an acid and/or an alcohol, during its degradation.

The degradable particulates included in the present invention should be capable of undergoing an irreversible degradation downhole but be stable at storage and manufacturing temperatures. As used in this disclosure, the term "irreversible" means that the degradable particulates once degraded should not recrystallize or reconsolidate downhole. As used herein, "hydrolytic degradation" refers to both heterogeneous (or bulk erosion) and homogenous (or surface erosion), and any stage of degradation between these two by the action of water on the particulate.

Where degradable polymers are included in the degradable compounds of the present invention, the degradable polymers may at least partially prevent fluid loss after introduction of the treatment fluid into the subterranean formation. At downhole temperatures above the glass transition temperature ("$T_g$"), the degradable polymers may have properties (e.g., hardness, stability) that may act to at least partially prevent breakage or degradation and yet maintain pliability which is desirable in fluid loss control applications. Where desirable, the glass transition temperature of the degradable polymer may be designed to a specific temperature by a variety of factors, including but not limited to, the choice of polymer, plasticizer and/or concentration of plasticizer.

The combination of a plasticizer along with a degradable polymer can be used to decrease the $T_g$ of the degradable polymer and allow the polymer to be designed into a desirable malleable particulate. The plasticizers may be present in an amount sufficient to provide the desired characteristics, for example, a desired pliability to the generated degradable particulates. Generally, the type and amount of plasticizer, in some of the particulate embodiments, should lower the $T_g$ such that the polymer does not significantly soften until it has been placed into a subterranean formation and/or packed into a fracture. In other words, the $T_g$ of the polymer should fall between the temperature of the surface and the temperature of the subterranean formation below. If premature plasticization occurs, the ease of manufacture, use and storage of the degradable particulates may be reduced. The plasticizers are preferably at least intimately incorporated within the degradable materials. Examples of plasticizers useful for this invention include, but are not limited to, polyethylene glycol; polyethylene oxide; oligomeric lactic acid; citrate esters (such as tributyl citrate oligomers, triethyl citrate, acetyltributyl citrate, and acetyltriethyl citrate); glucose monoesters; partially fatty acid esters; PEG monolaurate; triacetin; poly(e-caprolactone); poly(hydroxybutyrate); glycerin-1-benzoate-2,3-dilaurate; glycerin-2-benzoate-1,3-dilaurate; bis(butyl diethylene glycol)adipate; ethylphthalylethyl glycolate; glycerin diacetate monocaprylate; diacetyl monoacyl glycerol; polypropylene glycol (and epoxy derivatives thereof); poly(propylene glycol)dibenzoate, dipropylene glycol dibenzoate; glycerol; ethyl phthalyl ethyl glycolate; poly(ethylene adipate)distearate; di-iso-butyl adipate; and combinations thereof. The choice of an appropriate plasticizer will depend on the particular application of use. When desirable, certain degradable polymers such as lactides are suitable as plasticizers as well. More pliable degradable materials may be beneficial in certain chosen applications. The addition of presence of a plasticizer can affect the relative degree of pliability. Also, the relative degree of crystallinity and amorphousness of the degradable material can affect the relative hardness of the degradable materials.

The plasticizers should be present in the degradable particulate composition in an amount sufficient to increase the pliability of the degradable compound at a desired temperature. In some embodiments, the plasticizers are present in an amount in the range of from about 0.25% to about 40% by weight of the particulate composition, wherein the amount of plasticizer used may include any amount between 0.25% to about 40%. In some embodiments, the amount of plasticizer used is in the range of from a lower limit of about 0.25%, 1%, 3%, 5%, 8%, 10%, 15%, 20%, 25%, 30%, 35%, and 39% to an upper limit of about 40%, 35%, 30%, 25%, 15%, 10%, 8%, 5%, 3%, 1%, and 0.50% by weight of the particulate composition wherein the amount percentage may range from any lower limit to any upper limit and encompass any subset between the upper and lower limits.

The choice of degradable polymer to include in the malleable particulates also can depend, at least in part, on the conditions of the well, e.g., well bore temperature. For instance, amorphous polylactic acid has been found, in certain embodiments, to be suitable for lower temperature wells, including those within the range of 40° C. to 75° C. In some embodiments, the glass transition temperature of the malleable particulate may be between about −15° C. to about 60° C. In some embodiments, the glass transition temperature of the malleable particulate may be between about −15° C. to about 40° C. In some embodiments, the glass transition temperature of the malleable particulate may be above about 0° C. Polylactic acid and dehydrated compounds may be suitable for higher temperature wells, for example those within the range of from 80° C. to 125° C. or even higher. Those of ordinary skill in the art will recognize that the degradation rate of the degradable materials is generally related to temperature so that higher temperature wells generally should result in less residence time of the degradable material downhole. Also, in some embodiments, a preferable result is achieved if the degradable particulate degrades slowly over time as opposed to instantaneously. In some embodiments, it may be desirable when the degradable particulate does not substantially degrade until after the degradable particulate has been substantially placed in a desired location within a subterranean formation and the further treatments have been completed.

The malleable particulates should be present in the particulate composition in an amount sufficient to provide reduced fluid loss or divert the fluid from one portion of the formation to another. In some embodiments, the degradable particulates are present in the treatment fluid in an amount ranging from a lower limit of about 0.25%, 0.5%, 0.75%, 1%, 1.5%, 2%, 3%, 5%, 7%, 10%, or 12% by volume of the treatment fluid to an upper limit of about 50%, 45%, 40%, 35%, 30%, 25%, 20%, 15% 10%, 8%, 6%, or 5% by volume of the treatment fluid, and wherein the percentage of degradable particulates may range from any lower limit to any upper limit and encompass any subset between the upper and lower limits. Some of the lower limits listed above are greater than some of the listed upper limits, and one skilled in the art will recognize that the selected subset will require the selection of an upper limit in excess of the selected lower limit.

Optionally, the treatment fluids of the present invention also may include one or more of a variety of additional additives such as breakers, stabilizers, fluid loss control additives, clay stabilizers, bactericides, corrosion inhibitors, surfactants, oxidizers, starch, friction reducers, buffers, salts, pH control additives, gelling agents, crosslinkers, scale inhibitors, acids, bases, enzymes (e.g., esterases, lipases, etc.), combinations thereof, and the like. Those of ordinary skill in the art, with the benefit of this disclosure, will be able to select the appropriate additional additives to include in the fluids for a particular application.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid that comprises a base fluid and polymeric particulates;
wherein the polymeric particulates comprise a degradable polymer and a plasticizer and exhibit a glass transition temperature ($T_g$) above about −15° C.;
wherein the plasticizer is about 0.25% to about 40% by weight of the polymeric particulate;
introducing the treatment fluid into a subterranean formation penetrated by a wellbore and having a bottomhole static temperature from about 40° C.-75° C. such that the particulates transform from rigid to malleable form and are able to provide fluid loss, seal rock surfaces within the subterranean formation for fluid diversion, or plug an area along an annulus of the well bore; and,
degrading the malleable particulates over time in the subterranean formation.

2. The method of claim 1 wherein the polymeric particulates have a mean diameter in the range of about 5 microns to about 8000 microns.

3. The method of claim 1 wherein the polymeric particulates have a mean diameter of about 150 microns or greater.

4. The method of claim 1 wherein the base fluid comprises at least one component selected from the group consisting of: aqueous gel, gelling agent, water, brine, viscosified fluids, foams, viscoelastic surfactant gels, friction reducer, emulsion, and crosslinking agent.

5. The method of claim 1 wherein the polymeric particulates release acid or alcohol during degradation.

6. The method of claim 1 wherein the malleable particulates are present in about 0.25% to about 50% by weight of the treatment fluid.

7. The method of claim 1 wherein the degradable polymer is selected from the group consisting of: chitin; chitosan; proteins; aliphatic polyester; polylactic acids; poly(glycolides); poly(ε-caprolactones); poly(hydroxy ester ethers); poly(hydroxybutyrates); poly(anhydrides); polycarbonates;

poly(orthoesters); poly(amino acids); poly(ethylene oxides); poly(phosphazenes); poly etheresters; polyester amides; polyamides; and copolymers.

8. The method of claim 1 wherein the plasticizer is selected from the group consisting of: polyethylene glycol, polyethylene oxide; oligomeric lactic acid, citrate esters (such as tributyl citrate oligomers, triethyl citrate, acetyltributyl citrate, and acetyltriethyl citrate), glucose monoesters, partially fatty acid esters, PEG monolaurate, triacetin, poly(e-caprolactone), poly(hydroxybutyrate), glycerin-1-benzoate-2,3-dilaurate, glycerin-2-benzoate-1,3-dilaurate, bis(butyl diethylene glycol)adipate, ethylphthalylethyl glycolate, glycerin diacetate monocaprylate, diacetyl monoacyl glycerol, polypropylene glycol (and epoxy derivatives thereof), poly(propylene glycol)dibenzoate, dipropylene glycol dibenzoate, glycerol, ethyl phthalyl ethyl glycolate, poly(ethylene adipate)distearate, and di-iso-butyl adipate.

9. The method of claim 1 wherein the glass transition temperature of the malleable particulate is above about 40° C.

10. A method comprising:
providing a treatment fluid that comprises a base fluid and malleable particulates wherein the malleable particulates comprise a degradable polymer and a plasticizer and wherein the malleable particulates have a mean particulate size of between 5 microns and 8000 microns and wherein the plasticizer is about 0.25% to about 40% by weight of the malleable particulates;
introducing the treatment fluid into a subterranean formation penetrated by a wellbore, such that the malleable particulates provide fluid loss, seal rock surfaces within the subterranean formation for fluid diversion, or plug an area along an annulus of the well bore; and,
degrading the malleable particulates over time in the subterranean formation.

11. The method of claim 10 wherein the malleable particulates have a mean particulate size of between 150 microns and 800 microns.

12. The method of claim 10 wherein the base fluid comprises at least one component selected from the group consisting of: aqueous gel, gelling agent, water, brine, viscosified fluids, foams, viscoelastic surfactant gels, emulsion, and crosslinking agent.

13. The method of claim 10 wherein the malleable polymer releases acid or alcohol during degradation.

14. The method of claim 10 wherein the malleable particulates are present in about 0.25% to about 50% by weight of the treatment fluid.

15. The method of claim 10 wherein the degradable polymer is selected from the group consisting of: chitin; chitosan; proteins; aliphatic polyester; polylactic acids; poly(glycolides); poly(ε-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly etheresters; polyester amides; polyamides; and copolymers.

16. The method of claim 10 wherein the plasticizer is selected from the group consisting of: polyethylene glycol, polyethylene oxide; oligomeric lactic acid, citrate esters (such as tributyl citrate oligomers, triethyl citrate, acetyltributyl citrate, and acetyltriethyl citrate), glucose monoesters, partially fatty acid esters, PEG monolaurate, triacetin, poly(e-caprolactone), poly(hydroxybutyrate), glycerin-1-benzoate-2,3-dilaurate, glycerin-2-benzoate-1,3-dilaurate, bis(butyl diethylene glycol)adipate, ethylphthalylethyl glycolate, glycerin diacetate monocaprylate, diacetyl monoacyl glycerol, polypropylene glycol (and epoxy derivatives thereof), poly(propylene glycol)dibenzoate, dipropylene glycol dibenzoate, glycerol, ethyl phthalyl ethyl glycolate, poly(ethylene adipate)distearate, and di-iso-butyl adipate.

17. The method of claim 10 wherein the malleable particulates have a glass transition temperature between about −15° C. to about 60° C.

18. A method comprising:
providing a treatment fluid that comprises a base fluid and malleable particulates wherein the malleable particulates comprise a degradable polymer and a plasticizer, wherein the malleable particulates have a glass transition temperature between about −15° C. to about 60° C.;
introducing the treatment fluid into a subterranean formation penetrated by a wellbore and having a first bottomhole static temperature such that the malleable particulates provide fluid loss, seal rock surfaces within the subterranean formation for fluid diversion, or plug an area along an annulus of the well bore;
wherein the treatment fluid is introduced after the subterranean formation is hydraulically fractured, acid fractured, or both and wherein the hydraulic fracturing, acid fracturing, or both reduces the first bottomhole static temperature to a second bottomhole static temperature; and,
degrading the malleable particulates over time in the subterranean formation.

19. The method of claim 18 wherein the glass transition temperature is from about −15° C. to about 40° C.

20. The method of claim 18 wherein the second bottomhole static temperature is reduced to about 40° C. or lower.

21. The method of claim 18 wherein the malleable particulates are degraded by an enzyme.

22. The method of claim 21 wherein the enzyme is a lipase or an esterase.

* * * * *